Feb. 1, 1955   H. F. SMITH   2,701,119
BALL COCK VALVE
Filed Dec. 12, 1951
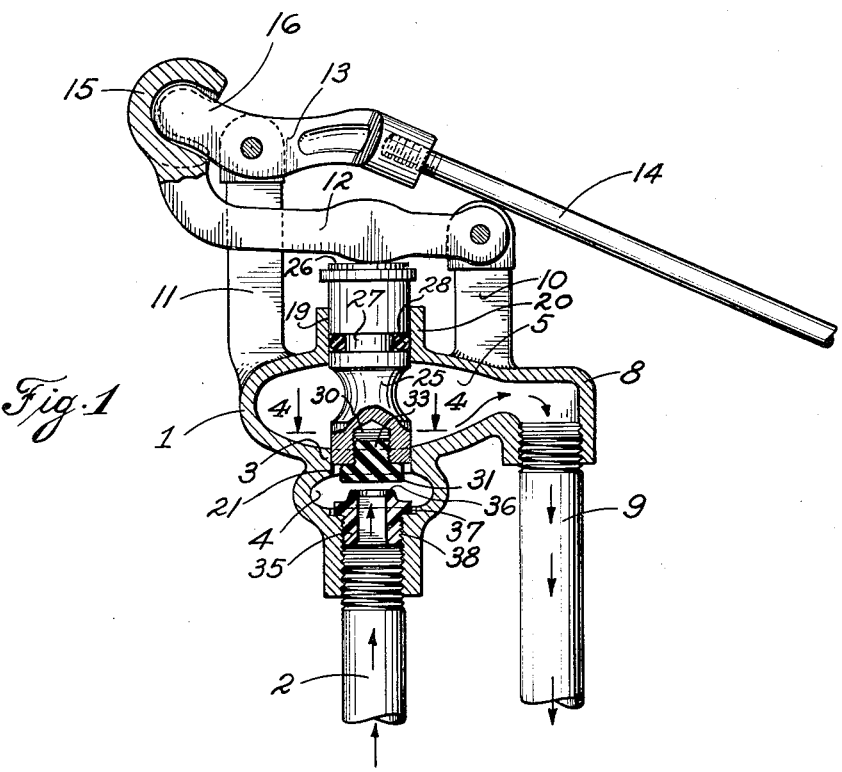
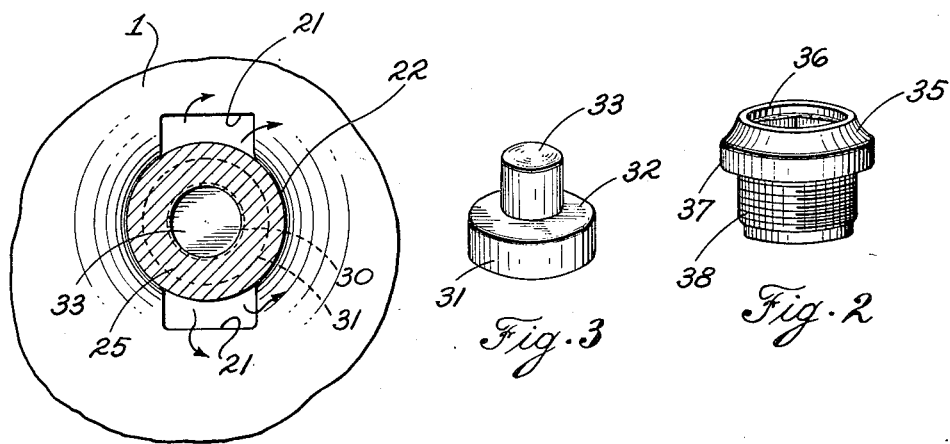
INVENTOR.
HARRY F. SMITH
BY
RICHEY, WATTS, EDGERTON & McNENNY
D. D. Watts
ATTORNEYS

United States Patent Office

2,701,119
BALL COCK VALVE

Harry F. Smith, Lexington, Ohio, assignor to Mansfield Sanitary Pottery, Inc., Perrysville, Ohio, a corporation of Ohio Application December 12, 1951, Serial No. 261,334

1 Claim. (Cl. 251—320)

This invention relates generally to ball cock valves and is particularly concerned with such valves in which the parts will be freely movable relatively throughout long periods of use or disuse.

Ball cock valves in use at present possess numerous disadvantages which workers in the art have long tried to overcome. Due to the chemical action of waters containing corrosive substances and also due to electrolysis, the metals constituting the plug and valve body and also the packings and gasket materials tend to corrode and adhere to one another. As a result of corrosion and adherence of the plug to the body or the seat to the gasket, it has been necessary heretofore to provide a "pull out" notch on the outer end of the plug for engagement with a lever associated with the float. Even this means is sometimes insufficient to move the plug endwise where the valves have remained in disuse for an extended period of time.

The present invention overcomes the difficulties traceable to such corrosion and adherence of the parts and not only makes the "pull out" notch unnecessary, but provides a ball cock valve in which the plug will move freely through long periods of use and disuse.

The present invention, as will more fully appear hereinafter, provides a new combination of elements, some of which are composed of new materials, which combination gives new and unexpected results.

In the drawings accompanying and forming a part of this specification:

Fig. 1 is a longitudinal, sectional view through a ball cock valve embodying the present invention;

Fig. 2 is an enlarged, perspective view of the valve seat of Fig. 1;

Fig. 3 is an enlarged, perspective view of the valve or gasket of Fig. 1; and

Fig. 4 is a fragmentary, sectional view taken on line 4—4 of Fig. 1.

Fig. 1 shows a ball cock valve comprising a valve body 1 screw-threaded on the open end of an inlet pipe 2 and having a partition 3 which divides the interior of the body into chambers 4 and 5. The body is extended laterally, as at 8, and is provided with a threaded opening into which discharge pipe 9 is screwed. Short and long legs 10 and 11 project from the end of body 1. A lever 12 is pivoted to short leg 10 and a lever 13 carrying a float rod 14 is pivoted to long leg 11. The adjacent ends 15 of lever 12 and 16 of lever 13 are interfitted for relative movement.

Between legs 10 and 11 a boss 20 extends from the body. Aligned with the cylindrical opening 19 through boss 20 is the generally rectangular opening 21 through partition 3, the opposite sides of said opening being arc-shaped as shown at 22 in Fig. 2.

A plunger 25 is mounted for endwise movement in the cylindrical opening in boss 20 and in opening 21. This plunger 25 has a flat outer end 26 on which lever 12 bears for moving the plunger endwise into the housing when the float rises and forces lever 12 downwardly. Between its ends plunger 25 has an annular groove 27 in which a packing 28 is disposed to engage the wall of plunger-receiving opening 19 and seal against escape of liquid out of chamber 5 around the plunger. Preferably an O-ring is used as such packing but other suitable packing may be used.

At its inner end plunger 25 has a threaded axial hole 30 in which is mounted a valve 31. This valve (Fig. 3) has a disk-shaped portion 32 and a cylindrical projection or stub 33 projecting axially from one side thereof. This stub 33 is preferably of such size that it will have screw-threaded engagement with the threads in hole 30.

The valve seat 35 (Fig. 2) is tubular, has a seating surface 36 at one end, a flange 37 between its ends to seat on an annular shoulder of the valve body and is exteriorly screw-threaded on its other end, as at 38, to engage with corresponding threads in the valve body. This seat 35 is axially aligned with the plunger 25 and valve 31 and is engaged by the latter when the valve is closed.

The valve seat 35 may be assembled with the body by passing it through the openings in stud 20 and opening 21 in partition 3. When the plunger is in place in the body as shown in Fig. 1, water passing out through the valve seat 35 from inlet pipe 2 may pass through openings 21 at either side of the plunger 25 and thence into chamber 5 and out through pipe 9.

The plunger 25, packing 28, valve 31 and seat 35 should not conduct stray electric currents and should be resistant to chemical and electrolytic corrosion and to erosion and abrasion. The plunger and seat should be sufficiently firm to take the mechanical stresses imposed thereon without appreciable deformation. The packing and valve should be elastically deformable to such an extent as will give the desired sealing action. Many materials satisfy these conditions, such as sulfur-free rubber, polystyrine, "Nylon," "Neoprene," synthetic resins of the ordinary vinyl copolymers as well as vinyl copolymers with synthetic rubbers such as Buna-N rubber and other similar synthetic resins. The plunger may be made of hard, sulfur-free rubber, molded polystyrine, "Nylon" or vinyl copolymers, for example, "Uscolite," or other similar synthetic resins. The packing 28 should be round in cross-section so as to roll on the cylindrical wall of the valve body and preferably consists of "Neoprene" or the like. The valve 31 may be made of "Neoprene" or sulfur-free rubber which is sufficiently deformable elastically to make good sealing contact with the valve seat. The seat 35 is preferably composed of "Nylon" although several of the other materials just mentioned are suitable. "Nylon" is preferred because in addition to the above mentioned properties it is strong and tough enough to carry and to be retained in place by fine threads, which threads are capable of cooperating with threads in the valve body closely enough to seal against the passage of fluid between the threads and without the use of any sealing material such as cement.

It will be understood from the foregoing description that since the plunger is not susceptible to corrosion it has no tendency to adhere to the metal body and hence will remain free-acting during long periods of use and disuse of the valve. Likewise, the packing will not adhere to either the body or the plunger and is similarly ready for rolling action at any time. In the same way the materials of the valve seat exhibit no tendency to adhere to one another. Since the plunger is readily movable outwardly endwise by the force of the incoming water, the usual "pull out" notch is not required.

Having thus described the present invention so that others skilled in the art may be able to understand and practice the same, I state that what I desire to secure by Letters Patent is defined in what is claimed.

What is claimed is:

A ball cock valve assembly comprising a metal valve body having an inlet opening and a plunger-receiving opening, a plunger slidable in said plunger-receiving opening and having a groove therearound within said opening, said plunger being composed of hard, molded, rubber or synthetic resin-containing material which is substantially free from sulphur, is electrically insulating, is resistant to corrosion and is sufficiently rigid to resist deformation in use, "Neoprene" packing in said groove around the plunger and engaging the walls of said plunger-receiving opening, a tubular "Nylon" valve seat having a threaded connection to the body in said inlet opening, and a "Neoprene" valve attached to the inner end of said plunger to engage said seat.

(References on following page)

References Cited in the file of this patent

UNITED STATES PATENTS

| | | |
|---|---|---|
| 1,361,878 | Kuehner | Dec. 14, 1920 |
| 1,579,140 | Phillips | Mar. 30, 1926 |
| 2,299,706 | Svirsky | Oct. 20, 1942 |
| 2,310,080 | Hill | Feb. 2, 1943 |
| 2,323,531 | Franck | July 6, 1943 |
| 2,364,107 | Svirsky | Dec. 5, 1944 |
| 2,376,402 | Svirsky | May 22, 1945 |
| 2,417,242 | Eckel | Mar. 11, 1947 |
| 2,431,437 | Van der Werff | Nov. 25, 1947 |
| 2,520,092 | Frederickson | Aug. 22, 1950 |
| 2,520,573 | Smith | Aug. 29, 1950 |

FOREIGN PATENTS

| | | |
|---|---|---|
| 10,716 | Great Britain | Oct. 14, 1899 |